Oct. 21, 1924.

T. A. SISSOM

INSECT DESTROYER

Filed Feb. 26, 1923

Thomas A. Sissom, Inventor

By John M. Spellman, Attorney

Oct. 21, 1924.
T. A. SISSOM
INSECT DESTROYER
Filed Feb. 26, 1923
1,512,643
3 Sheets-Sheet 2
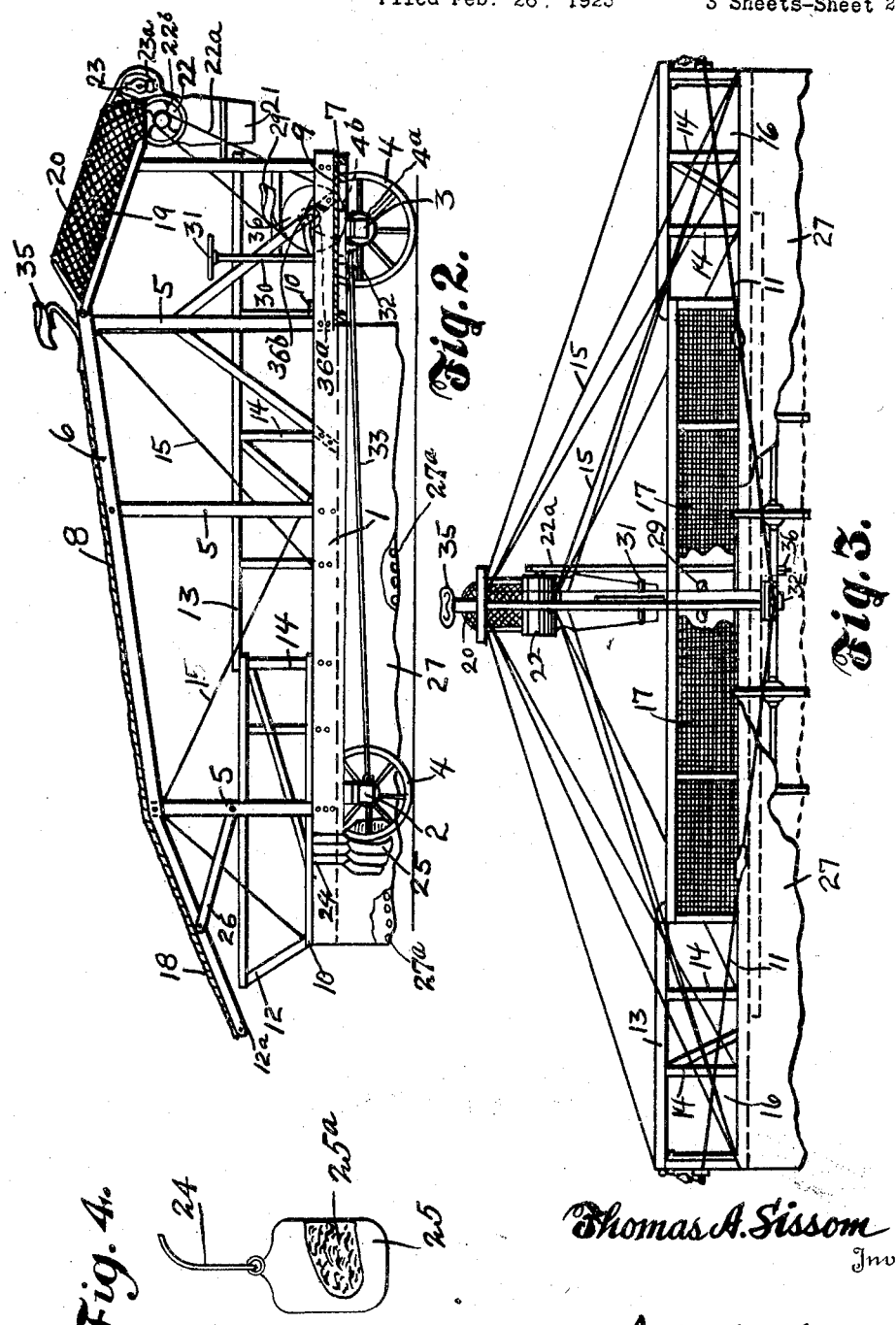

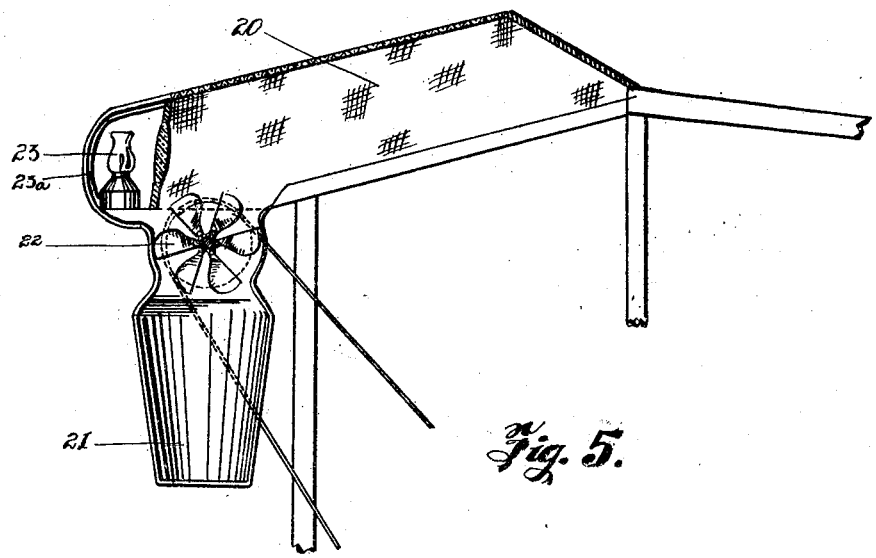

Patented Oct. 21, 1924.

1,512,643

UNITED STATES PATENT OFFICE.

THOMAS A. SISSOM, OF ITALY, TEXAS.

INSECT DESTROYER.

Application filed February 26, 1923. Serial No. 621,434.

*To all whom it may concern:*

Be it known that I, THOMAS A. SISSOM, a citizen of the United States, residing at Italy, in the county of Ellis and State of Texas, have invented certain new and useful Improvements in Insect Destroyers, of which the following is a specification.

This invention relates to certain new and useful improvements in insect destroyers and the primary object thereof is to provide an improved device for use more particularly in destroying insects which infest cotton plants.

The invention further aims to provide improved means for agitating the insects so as to cause same to fly away from the plants and improved means to subsequently trap the insects.

The invention further resides in the construction and combination of parts now to be fully described and claimed.

In the drawings:—

Figure 2, is a central longitudinal section;

Figure 3, is a front elevation, and

Figure 4, is a detail view, partly broken away of one of the rustling devices.

Figure 5 is a detail view, partly in section of the trapping means.

Figure 1:
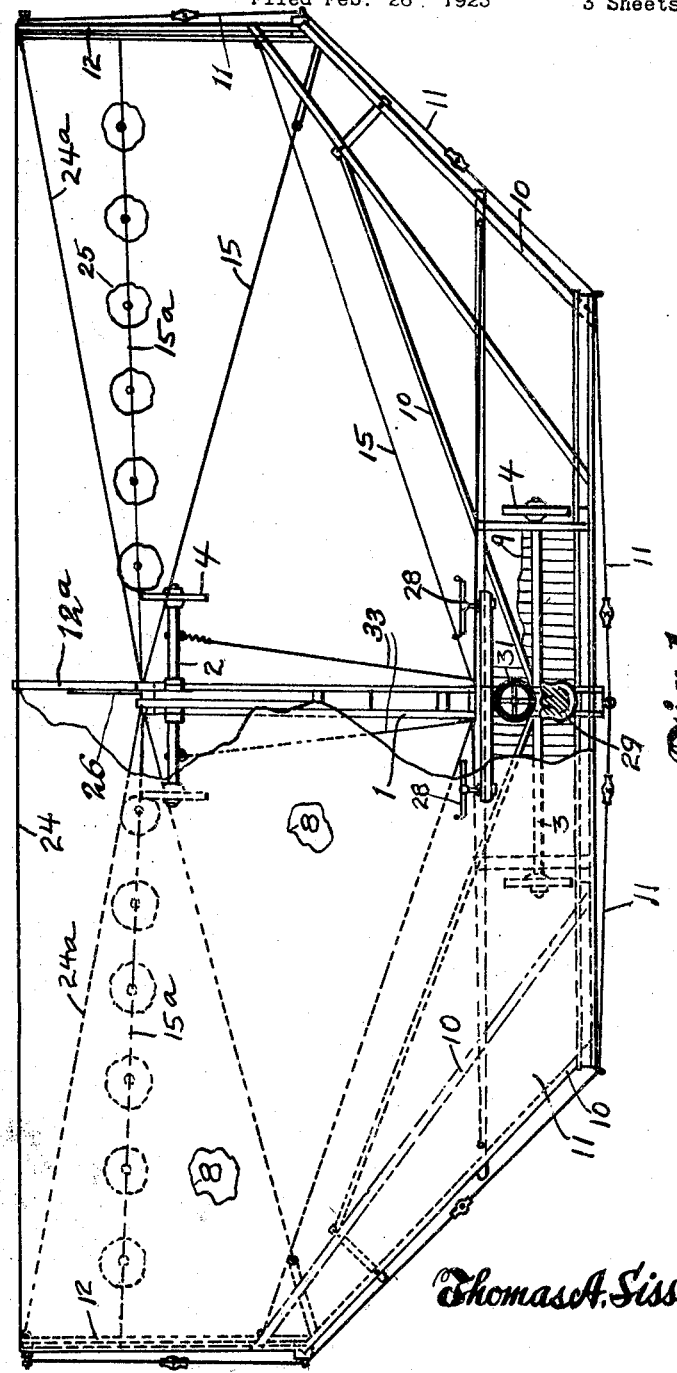
Figure 1, is a top plan view, partly broken away.

The invention embodies a frame 1 supported on a front axle 2 and rear axle 3 each having traction wheels 4 thereon. The frame has side wings formed by horizontal diverging bars 10 and parallel bars 12, braced by guy wires 11, 24 and 24$^a$. Vertical bars 14 and 5 extend upwardly from the horizontal bars, the bars 14 being connected by horizontal bars 13 and the bars 5 supporting bars 6 upon which latter the top 8 is secured. The top has a downwardly inclined front or bill 18 supported by bar 12$^a$ held by means of brace 26.

A seat 35 for the guide or observer is carried by the top, while the operator's seat 29 is located above the rear axle 3, the frame having an extension 7 provided with flooring 9 for the operator. A steering post 30 with a hand wheel 31 effects steering of the front axle by means of rods 33 connected to the front axle and to a member 32 carried by the post.

A tubular trap or screen 20 is supported by a rearwardly inclined extension 19 of the frame. A source of light 23 is disposed within a reflector 23$^a$ at the rear of the screen. A container 21 depends from the rear end of screen 20 and at its top has a suction fan 22 provided with blades 22$^b$ and driven by belt 22$^a$ from a wheel 36, which latter is operated by pulley 4$^a$ on the hub of wheel 4, a belt 4$^b$ being driven by pulley 4$^a$ and in turn driving a wheel 36$^a$ on a shaft 36$^b$ and on which latter shaft wheel 36 is mounted.

Cables 15$^a$ extend across the wings and are provided with depending rustling members 25, which latter pass between the rows of plants and agitate the insects. These members consist of sacks suspended from cords 24, the sacks being filled with shavings 25$^a$.

A wire screen 17 as shown in Figure 3, extends across the front end of the machine and serves to intercept the insects, as well as a depending curtain 27 weighted at 27$^a$ which curtain also acts to prevent the insects from passing beneath the machine.

The cover is of dark color except the parts thereof adjacent to the trap 20.

In operation, the harness of the draft animals is connected to the swingletrees 28. The machine is guided over the plants and due to the movement thereof the wires 15$^a$ and thereby devices 25 are caused to vibrate, resulting in rustling sound, as the devices 25 engage the ground. The insects are thus agitated and fly upwards, and being attracted by the light 23, enter trap 20 and due to the action of fan 22 are drawn into the container 21.

What is claimed is:—

1. In an insect destroyer, a wheeled frame, a series of rustling devices including bags having shavings therein, cords to suspend the bags, a wire from which the cords are suspended, a tubular trap open to the insects at one end, a container depending from the rear of the trap to receive the insects, a suction fan adjacent to the point of connection between the trap and container to draw the insects through the trap and into the container, and means to actuate the fan.

2. In an insect destroyer, a wheeled frame, a series of rustling devices including bags, having shavings therein, cords to suspend the bars, a wire from which the cords are suspended, and means to trap and hold the insects.

3. In an insect destroyer, a trap having a mouth open to the insects, a container communicating with the trap, suction means to draw the insects through the trap and into the container, and noise creating means carried by the frame and arranged in advance of the mouth of the trap and including freely suspended bags having loose noise creating media therein.

4. In an insect destroyer, a frame, insect trapping means on the frame, rustling devices including containers having noise-creating means therein, and means to suspend the containers from the frame so as to permit same to vibrate.

In testimony whereof I have signed my name to this specification.

THOMAS A. SISSOM.